United States Patent
Inokuchi et al.

(10) Patent No.: US 7,278,166 B2
(45) Date of Patent: Oct. 2, 2007

(54) METHOD AND APPARATUS FOR RECORDING AND/OR REPRODUCING DATA AND RECORD MEDIUM

(75) Inventors: Tatsuya Inokuchi, Kanagawa (JP); Yoichiro Sako, Tokyo (JP); Mitsuru Toriyama, Chiba (JP)

(73) Assignee: Sony Corporation (JP)

( * ) Notice: Subject to any disclaimer, the term of this patent is extended or adjusted under 35 U.S.C. 154(b) by 799 days.

(21) Appl. No.: 10/088,337

(22) PCT Filed: Jul. 17, 2001

(86) PCT No.: PCT/JP01/06183

§ 371 (c)(1),
(2), (4) Date: Jul. 1, 2002

(87) PCT Pub. No.: WO02/07161

PCT Pub. Date: Jan. 24, 2002

(65) Prior Publication Data

US 2002/0184537 A1    Dec. 5, 2002

(30) Foreign Application Priority Data

Jul. 17, 2000  (JP) .............................. 2000-216388
Aug. 30, 2000  (JP) .............................. 2000-260467

(51) Int. Cl.
*H04L 9/32*       (2006.01)
(52) U.S. Cl. ..................... 726/28; 726/29; 713/182; 713/193
(58) Field of Classification Search ............... 713/182, 713/193; 726/28, 29, 22–24
See application file for complete search history.

(56) References Cited

U.S. PATENT DOCUMENTS

| 5,596,639 | A |   | 1/1997 | Kikinis ........................... 380/4 |
| 5,754,648 | A | * | 5/1998 | Ryan et al. ................. 380/201 |
| 6,035,329 | A | * | 3/2000 | Mages et al. ............... 709/217 |
| 6,170,060 | B1 | * | 1/2001 | Mott et al. ..................... 726/29 |

(Continued)

FOREIGN PATENT DOCUMENTS

EP    0930616 A2    7/1999

(Continued)

OTHER PUBLICATIONS

Bramhill, I.D. et al.: "Challenges for copyright in a digital age" BT Technology Journal, GB, vol. 15, No. 2, Apr. 1, 1997, pp. 63-73, XP000703557, ISSN: 1358-3948. p. 67, left-hand column, lines 2-28, p. 71, left-hand column, lines 28 0right-hand column, line 22.

*Primary Examiner*—Gilberto Barron, Jr.
*Assistant Examiner*—Jung Kim
(74) *Attorney, Agent, or Firm*—Lerner, David, Littenberg, Krumholz & Mentlik, LLP

(57) ABSTRACT

A method of recording data to and reproducing data from a recording medium. Recording medium user identification data read from a recording medium upon which are recorded main data to be recorded and reproduced and the user identification data is compared with recorder and player user identification data read from a data recorder and player for recording and reproducing the main data and the main data are recorded to and reproduced from the recording medium when the recording medium user identification data are coincident with the recorder and player user identification data.

2 Claims, 13 Drawing Sheets

U.S. PATENT DOCUMENTS

| | | | |
|---|---|---|---|
| 6,308,269 B2 * | 10/2001 | Proidl | 713/193 |
| 6,385,596 B1 * | 5/2002 | Wiser et al. | 705/51 |
| 6,453,369 B1 * | 9/2002 | Imamura et al. | 710/36 |
| 6,681,015 B1 * | 1/2004 | Hioki et al. | 380/231 |
| 6,738,877 B1 * | 5/2004 | Yamakawa et al. | 711/164 |
| 2001/0016836 A1 * | 8/2001 | Boccon-Gibod et al. | 705/51 |
| 2002/0004884 A1 * | 1/2002 | Yamakawa et al. | 711/112 |

FOREIGN PATENT DOCUMENTS

| | | |
|---|---|---|
| WO | WO9918506 | 4/1999 |

* cited by examiner

METHOD AND APPARATUS FOR RECORDING AND/OR REPRODUCING DATA AND RECORD MEDIUM

TECHNICAL FIELD

The present invention relates to a method of and/or apparatus for recording and reproducing content data whose copyrights have to be managed, such as audio information, video information, game program and data, computer program, etc.

BACKGROUND ART

As the digital contents have become prevalent, the infringement on their copyrights by illicit copying has given birth to a social problem. In analog recording to a tape medium, audio or video data are recorded in an analog manner and so copying of the data will result in a lower quality. In digital data recording or reproduction, however, a digital data recorder/player can be used to repeatedly copy audio or video data many times with no quality degradation, in principle.

Thus, the loss due to such illicit copying has become greater in the field of digital recording/reproduction than in the analog field, and thus it has become very important to prevent illicit copying with any digital recording/players.

To solve the above problem, it has been proposed to add copy-control information to digital contents and use the added information in order to prevent illicit copying of the digital contents.

For example, the copyright protection method employing a generation-limiting copy control called "SCMS (serial copy management system) is applied to digital data recorder/players for CD (compact disc), MD (mini disc; registered trademark), DAT (digital audio tape), etc. The SCMS copy-control method is to authorize to copy an audio content once but inhibit any further copying of the thus once copied audio content.

The SCMS copy-control method will be described in detail below with reference to FIG. 1.

For example, it is assumed here that a disc 1 has original-source audio signals digitally recorded therein. The digital audio signals are recorded in a predetermined recording format in the disc 1, and there is recorded in a specific area in the digital signals additional information indicating that the SCMS copy-control method permits to copy the digital audio signals only once.

A disc player 2 plays back the disc 1 to reproduce the digital audio signals from signals read from the disc 1, and sends the digital audio signals along with the additional copy-control information to a disc recorder 3. For sending the digital audio signals to the disc recorder 3, the disc player 2 will normally take a length of time equal to the time taken for reading the signals from the disc 1 (at the same speed).

Receiving the digital audio signals, the disc recorder 3 recognizes, when the information added to the audio signals indicates that the received digital audio signals may be copied only once, that the input digital signals can be copied. The disc recorder 3 will record the digital signals as a copy to another recordable disc 4. In this case, the disc recorder 3 rewrites the additional information from "one copy allowed" to "further copy inhibited". Thus, the digital signals as the copy and also the additional information "further copy inhibited" are recorded or copied to the disc 4.

In case the digital audio signals thus recorded as the copy in the disc 4 (first-generation disc) are read from the disc 4 played in another disc player 5 and supplied to another disc recorder 6, however, since the disc recorder 6 will detect that the additional information included in the digital signals is "further copy inhibited", the digital audio signals cannot further be recorded to any recordable disc 7.

In this case, the copying speed is equal to that at which the audio signals have been sent from the disc player 2. That is, if a standard playback time is taken for reproduction of the audio signals, the copying speed will be equal to a normal playback speed.

The "standard playback time" is a real-time playback speed for audio signals, namely, it is a playback speed at which audio signals can be perceived by the person having the ordinary ability of hearing. For example, the standard speed for reproduction of data depends upon each player and is independent of the human perception.

As above, the SCMS copy-control method protects the copyright of data by permitting a first-generation copying in a recorder while inhibiting a second-generation copying from the first-generation copy.

The SCMS method is intrinsically intended to prevent copyrighted data from being copied in a large amount for unauthorized commercial distribution, rather than to inhibit such a second-generation copying. Therefore, it is not negative against the currently prevailing copyright concept that "free copying within a range of private use".

Recently, a variety of recording/reproducing media such as an MD (mini disc; registered trademark) player, card-type memory player incorporating a semiconductor memory, etc. have been commercially available. Thus, users can selectively use the MD player, card-type memory player or the like as a playing medium as they currently like. In these circumstances, copying is frequently done by the use of any of the above players, and the SCMS copy-control method allowing to copy data only from an original medium will be inconvenient even for copying of the data only for private use.

Many of the recent personal computers are provided each with a CD playing function to store (copy) musical information distributed via a CD into a hard disc in a hard disc drive built in the personal computer and reproduce the musical information from the hard disc. Copying to the card-type memory player can be effected at such a high speed that copying from the hard disc in the personal computer will be more convenient. More precisely, copying from the hard disc to the card-type memory player provides a second-generation copy while musical information stored in the hard disc cannot be copied to the card-type memory player.

DISCLOUSURE OF THE INVENTION

Accordingly, the present invention has an object to overcome the abovementioned drawbacks of the prior art by providing a data recording method and apparatus not adopting the SCMS copy-control method but permitting free copying within the range of private use and effective prevention of illicit copying for unauthorized commercial distribution of data.

The above object can be attained by providing a method of recording and/or reproducing data to and/or from a recording medium, including steps of:

comparing a user identification data read from a recording medium having recorded therein the user identification data along with main data, with a one read from a data recorder/player, for recording or reproduction of the main data to or from the recording medium; and recording or reproducing the main data to or from the recording medium when the user identification data read from the recording medium is coincident with that read from the data recorder/player.

Also the above object can be attained by providing a recording-medium recorder including:

a head to scan a recording medium having stored therein a user identification data along with main data;

a memory having a user identification data recorded therein; and a controller to compare the user identification data read by the head from the recording medium with that read from the memory and control operations for reproduction of the main data from the recording medium on the basis of the result of comparison.

Also the above object can be attained by providing a recording-medium player, including:

a head to scan a recording medium having recorded therein encrypted data as well as at least a user identification data and reproduction management data;

a memory having a user identification data stored therein; and a controller to compare the user identification data read by the head from the recording medium with that read from the memory and control operations for playback of the recording medium on the basis of the result of comparison.

Also the above object can be attained by providing a method of controlling data copying, including steps of:

comparing a user identification data read from main data having at least the user identification data buried therein, with a one read from a data recorder/player, for copying of the main data; and controlling data output when the user identification data extracted from the data in coincident with that read from the data recorder/player.

Also the above object can be attained by providing a data reproducing method including steps of:

comparing a user identification data extracted from main data having at least the user identification data buried therein, with a one read from a data recorder/player, for reproduction of the main data; and reproducing the data when the user identification data extracted from the main data is coincident with that read from the data recorder/player.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail concerning recording and reproduction of audio signals to and from a disc-shaped recording medium, by way of example.

FIRST EMBODIMENT

Figure 1:
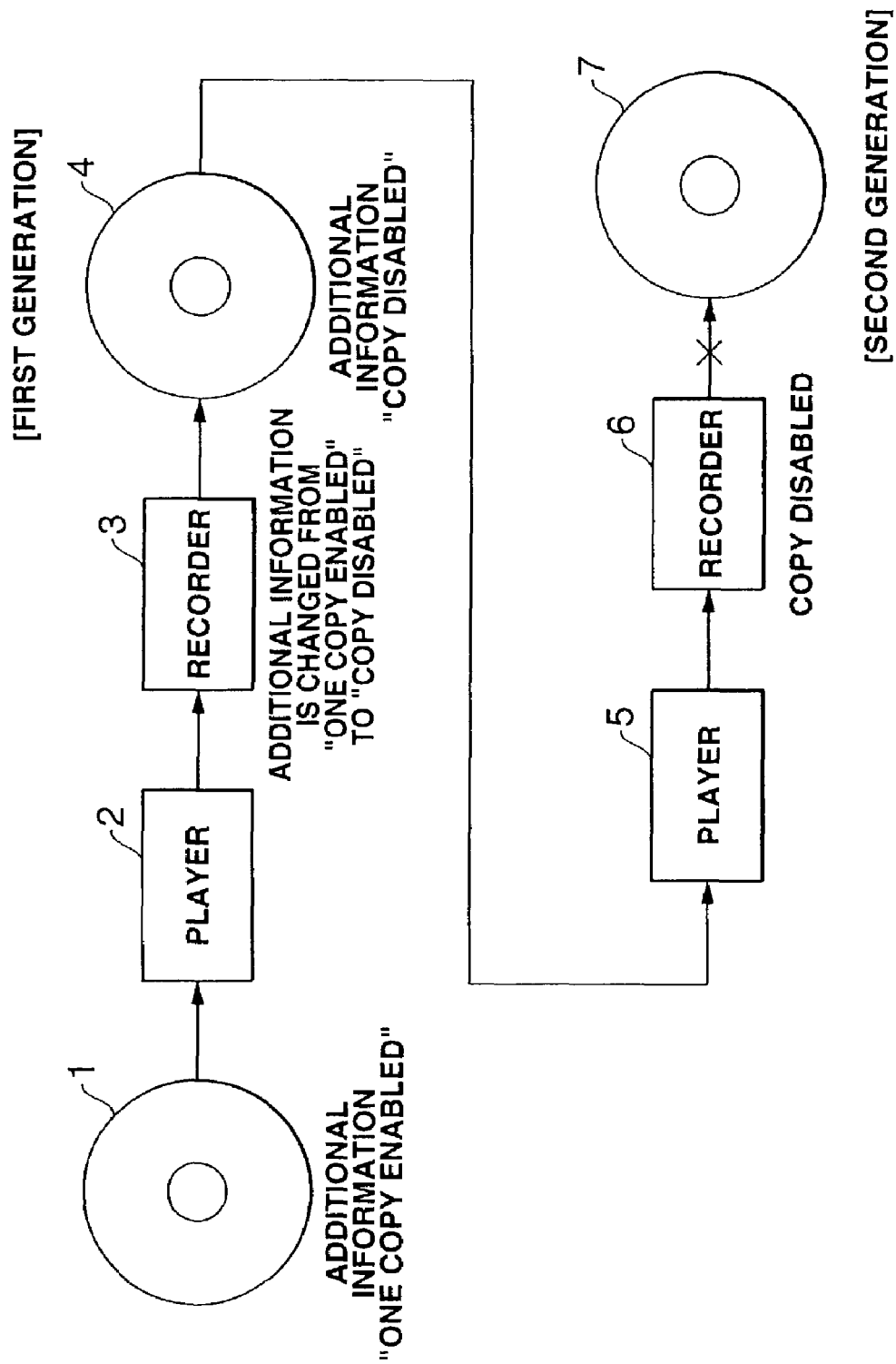
FIG. 1 explains the SCMS-based copy-generating limiting method.
Figure 2:
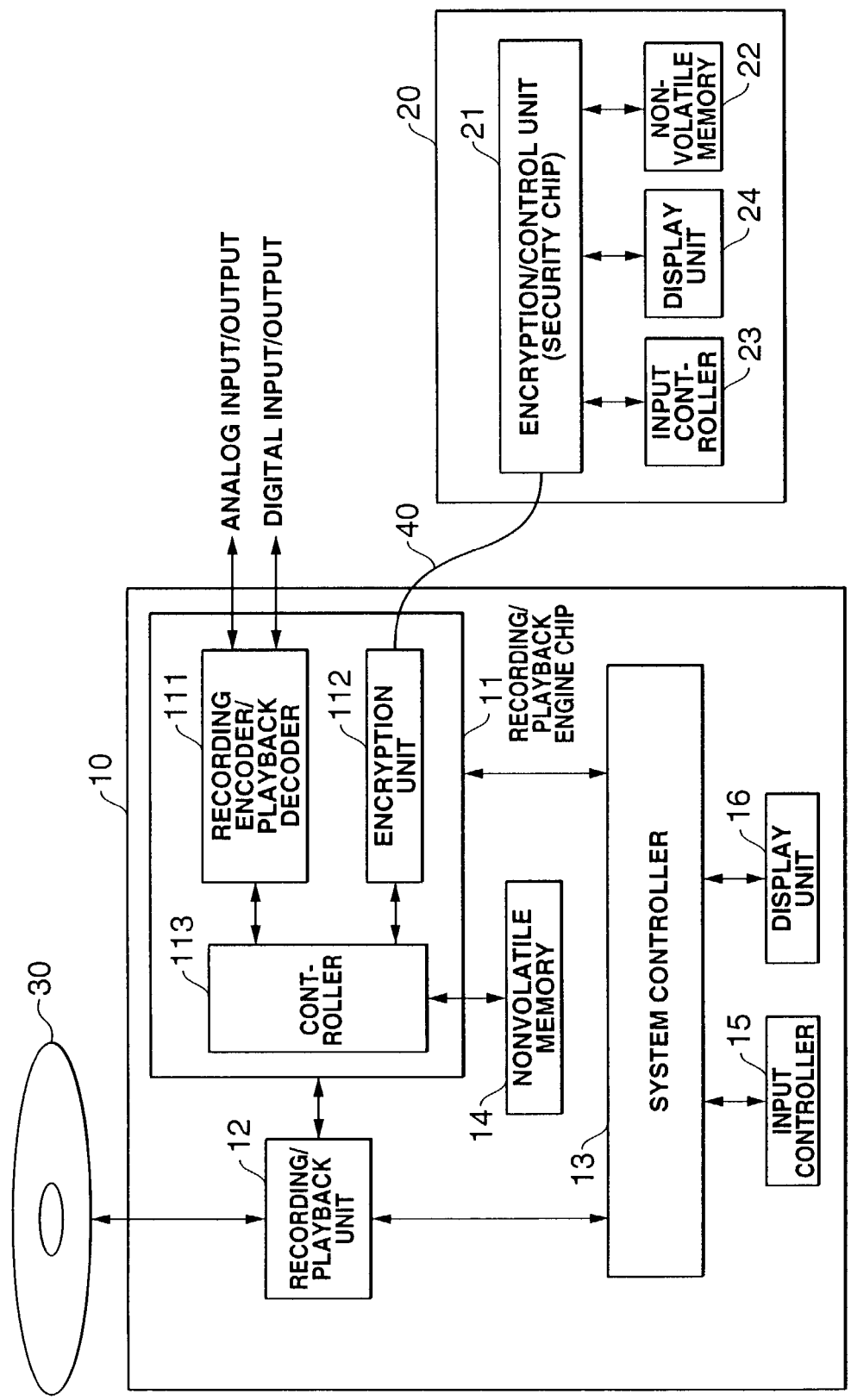
FIG. 2 is a block diagram of a first embodiment of the present invention.

FIG. 2 is a block diagram of the first embodiment of the data recording/playback system according to the present invention.

As shown in FIG. 2, the recording/playback system includes a data recorder/player 10 according to the present invention, and a user identification image server 20. The user identification data server 20 will also be referred to as "user ID module" in the following description. According to this embodiment, all the data recorder/players 10 are provided with terminals for connection of the user ID module 20. Information transferred between the data recorder/player 10 and user ID module 20 via the interconnection terminals is encrypted for security.

As shown, the data recorder/player 10 includes a recording/playback signal processor (will be referred to as "recording/playback engine chip" hereunder) 11, recording/playback unit 12, system controller 13, nonvolatile memory 14, input controller 15, and a display unit 16. The recording/playback engine chip 11 includes, as functional units, a recording encoder/playback decoder 111, encryption unit 112 to establish a communication bus for encrypted-data communication with the user ID module 20, and a controller 113.

The recording encoder/playback decoder 111 included in the recording/playback engine chip 11 is controlled by the system controller 13 to encode, for recording, analog or digital audio signals supplied thereto and provide the thus encoded signals to the recording/playback unit 12, for recording, as will be described later, and decode, for reproduction, the data reproduced from the recording/playback unit 12 and outputting the thus decoded signals, for data reproduction, as will also be described later.

The encryption unit 112 in the recording/playback engine chip 11 is connected to the user ID module 20 by a cable 40 in the embodiment shown in FIG. 2. In this embodiment, the encryption unit 112 functions, under the control of the system controller 13, to make mutual authentication with the user ID module 20 and establish a communication path to the user ID module 20 when they have successfully authenticated each other. In this case, to prevent any fraudulence such as a pretense as an authorized data recorder/player 10, a new encryption key for encryption and decryption is transmitted between the data recorder/player 10 and user ID module 20, and used to encrypt data to be transferred between the data recorder/player 10 and user ID module 20, before making any communication between the data recorder/player 10 and user ID module 20.

The controller 113 in the recording/playback engine chip 11 controls the recording encoder/playback decoder 111 and the encryption unit 112 according to a control signal supplied from the system controller 13, while controlling write and read of a user identification data to the nonvolatile memory 14 connected to the controller 113.

The recording/playback unit 12 is controlled by the system controller 13 to record the recorded signals from the recording/playback engine chip 11 to a disc 30, and also supplies the data read from the disc 30 to the recording/playback engine chip 11.

The system controller 13 provides a control conforming to an instruction given by the user operating the input controller 15, and sends necessary data to the display unit 16 for display on the screen of the latter. The display element of the display unit 16 may be a liquid crystal display, for example.

The user ID module 20 is accessory to one data recorder/player 10, and supplies a user identification data (will be referred to as "user ID" hereunder) to the data recorder/player 10. As shown in FIG. 2, the user ID module 20 includes an encryption/control unit (will be referred to as "security chip" hereunder) 21, nonvolatile memory 22, input controller 23 and a display unit 24.

The security unit 21 functions to make mutual authentication with the recording/playback engine chip 11 and establish a communication path to the recording/playback engine chip 11 when they have successfully authenticated each other. In this case, to prevent the aforementioned fraudulence such as a pretense, a new encryption key for encryption and decryption is transmitted between the data recorder/player 10 and user ID module 20 before making communication between the data recorder/player 10 and user ID module 20.

The nonvolatile memory 22 has module identification information unique to each user ID module 20 (will be referred to as "module ID" hereunder) such as a unique numeral value written therein at shipment from factory.

After purchasing the data recorder/player 10, the user shall operate the input controller 23 to register his or her name (user name) to the user ID module 20 accessory to his or her data recorder/player 10 while viewing the screen of the display unit 24.

[User Name Registration to User ID Module 20]

Figure 3:
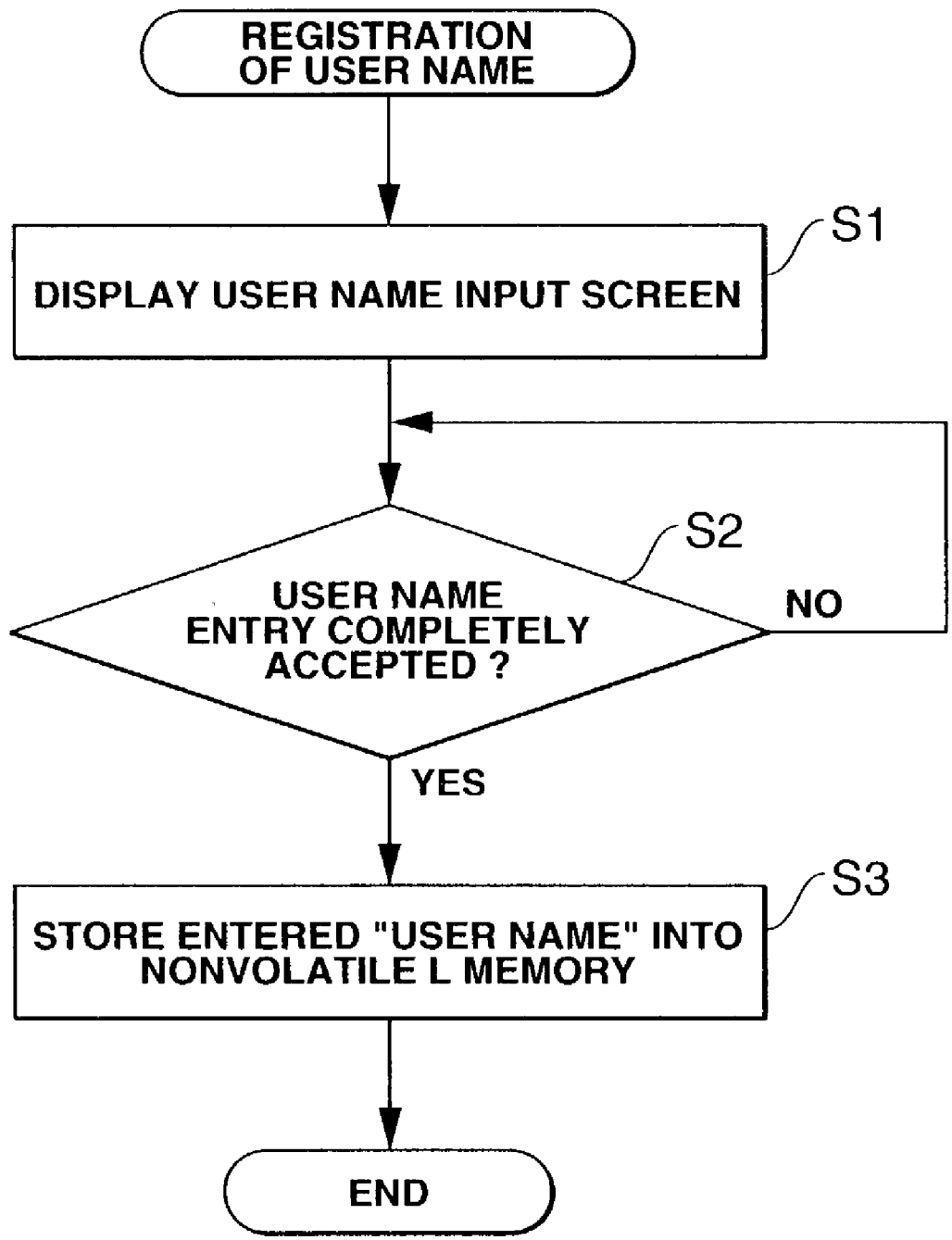
FIG. 3 is a flow chart for explanation of the operations of the first embodiment of the present invention.

FIG. 3 shows a flow of operations to be made for registering a "user name" to the user ID module 20.

First, the user ID module 20 displays a "user name" input screen on the display unit 24 to prompt the user to enter his name (user name) to the user ID module 20 (in step S1). When the user has entered his name by operating the input controller 23 while viewing the display on the display unit 24, the user ID module 20 will make sure that the user name has completely been entered via the input controller 23 (in step S2), and then store the thus entered "user name" into the nonvolatile memory 22. These operations are effected under the control of the security chip 21.

Note that when a registered user name check mode is selected via the input controller 23, the user name thus supplied and registered will be read from the nonvolatile memory 22 and displayed on the screen of the display unit 24, whereby the user can make sure the user name has been registered.

When the entered "user name" is correlated one-to-one with a "module ID" prestored in the nonvolatile memory 22, the module ID will substantially mean the user ID. That is to say, according to the present invention, the user ID means both the module ID and user name in one case, and only the module ID in another case.

[User ID Registration to the Data Recorder/Player]

After registering the user name to the user ID module 20, the user has to connect the user ID module 20 to the data recorder/player 10 for registration of his user ID to the data recorder/player 10.

Figure 4:
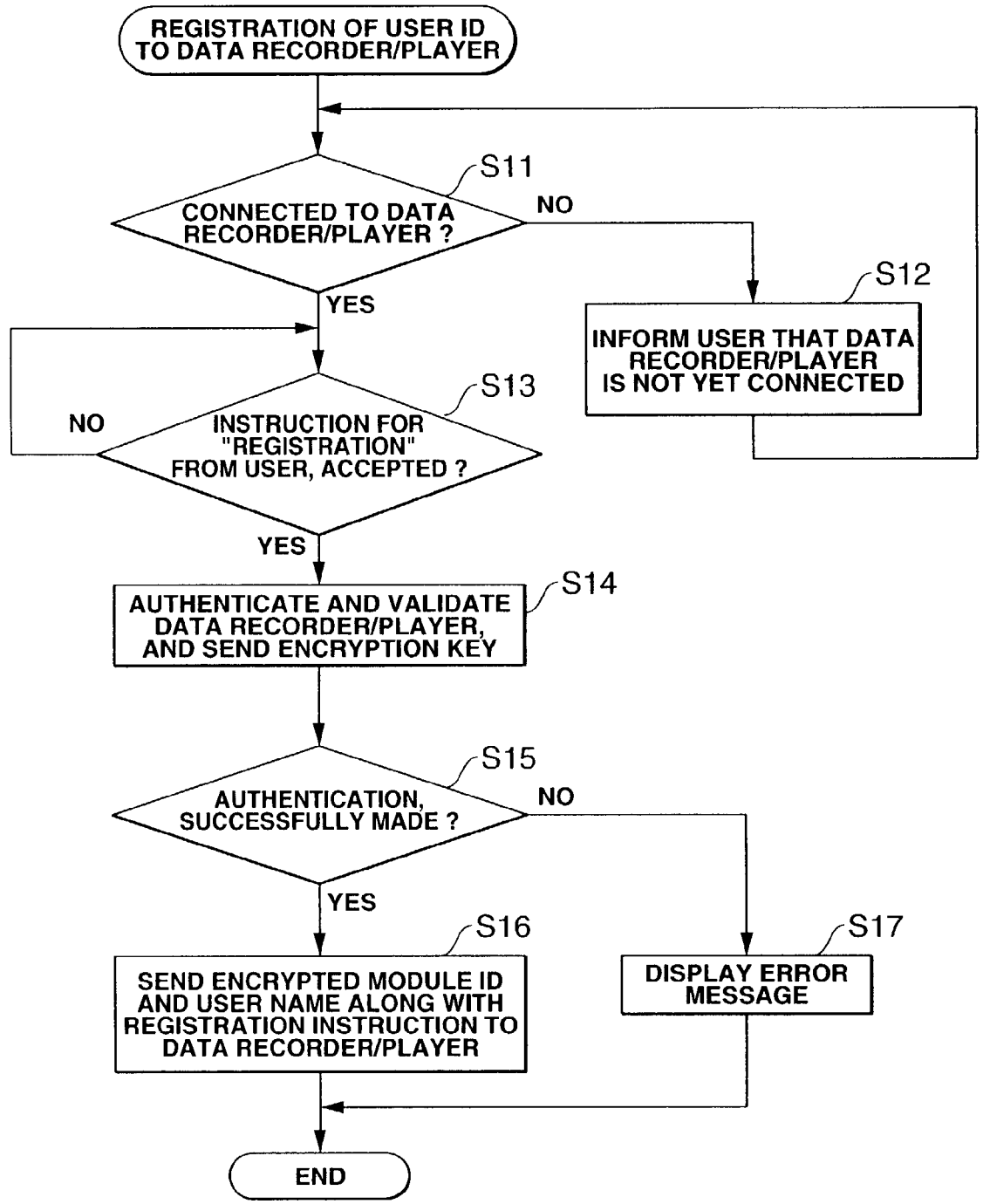
FIG. 4 is also a flow chart for explanation of the operations of the first embodiment of the present invention.
Figure 5:
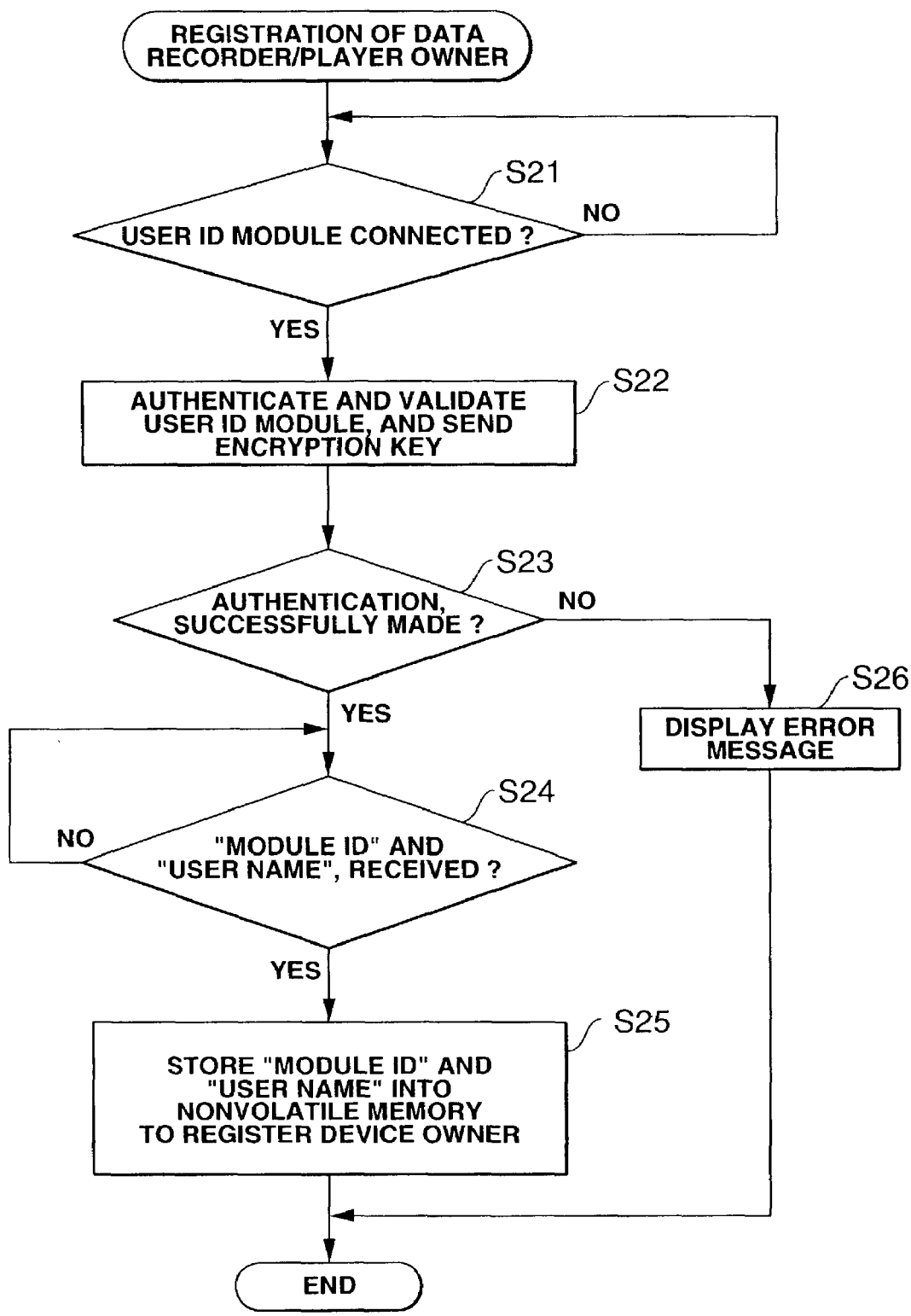
FIG. 5 is also a flow chart for explanation of the operations of the first embodiment of the present invention.

FIGS. 4 and 5 show flows of operations effected in registering the user ID to the data recorder/player 10 by means of the user ID module 20. FIG. 4 shows a flow of operations made at the user ID module 20, while FIG. 5 shows a flow of operations made at the data recorder/player 10.

<Operations Made at the User ID Module 20>

As shown in FIG. 4, the user ID module 20 judges first whether it is connected to the data recorder/player 10 (in step S11). If the user ID module 20 judges in step S11 that it is not yet connected, it will inform the user, by displaying a list on the display unit 16 or otherwise, that the data recorder/player 10 is not yet connected to the user ID module 20, and prompt the user to connect the data recorder/player 10 to the user ID module 20 (in step S12).

When it is detected that the user ID module 20 is connected to the data recorder/player 10, the user ID module 20 waits for an "instruction for registration" given by the user via the input controller 23 (in step S13). When it is detected that the registration instruction has been accepted, the user ID module 20 will authenticate and validate the recording/playback engine chip 11 of the data recorder/player 10 and transmit an encryption key (in step S14).

The user ID module 20 judges whether it has successfully made the mutual authentication with the recording/playback engine chip 11 and established a communication path (in step S15). If the user ID module 20 has failed in the authentication and in establishment of the communication path, it will exit this routine of operation with display of an error message on the display unit 24 (in step S17). When the user ID module 20 has succeeded in establishment of the communication path in step S15, it will read the module ID and user name from the nonvolatile memory 22, encrypt them and send them along with a registration instruction to the data recorder/player 10 (in step S16).

<Operations Made at the Data Recorder/Player 10>

As shown in FIG. 5, the data recorder/player 10 first waits until the user ID module 20 is connected thereto. When it judges that the user ID module 20 is connected (in step S21), the recording/playback engine chip 11 will authenticate and validate the user ID module 20 and transmit an encryption key (in step S22).

The recording/playback engine chip 11 judges whether it has successfully authenticated the user ID module 20 and established a communication path could (in step S23). If it is judged in step S23 that the data recorder/player 10 has failed in the authentication and in establishment of the communication path, it will exit this routine of operation with display of an error message on the display unit 16 (in step S26).

When the recording/playback engine chip 11 judges in step S23 that the communication could be established, it will wait for a registration instruction including "module ID" and "user name" sent from the user ID module 20 (in step S24). Upon confirmation of that reception, the recording/playback engine chip 11 will store the received module ID and user name into the nonvolatile memory 14 to register the device owner (in step S25).

Note that when a registered user name check mode is selected via the input controller 15, the user name thus supplied and registered will be read from the nonvolatile memory 14 and displayed on the screen of the display unit 16, whereby the user can make sure that the user name has been registered.

The user ID of the data recorder/player 10, thus registered once, can be re-set to another user ID by re-registering using the user ID module 20.

[Recording Operations Made at the Data Recording/Player 10]

Figure 6:
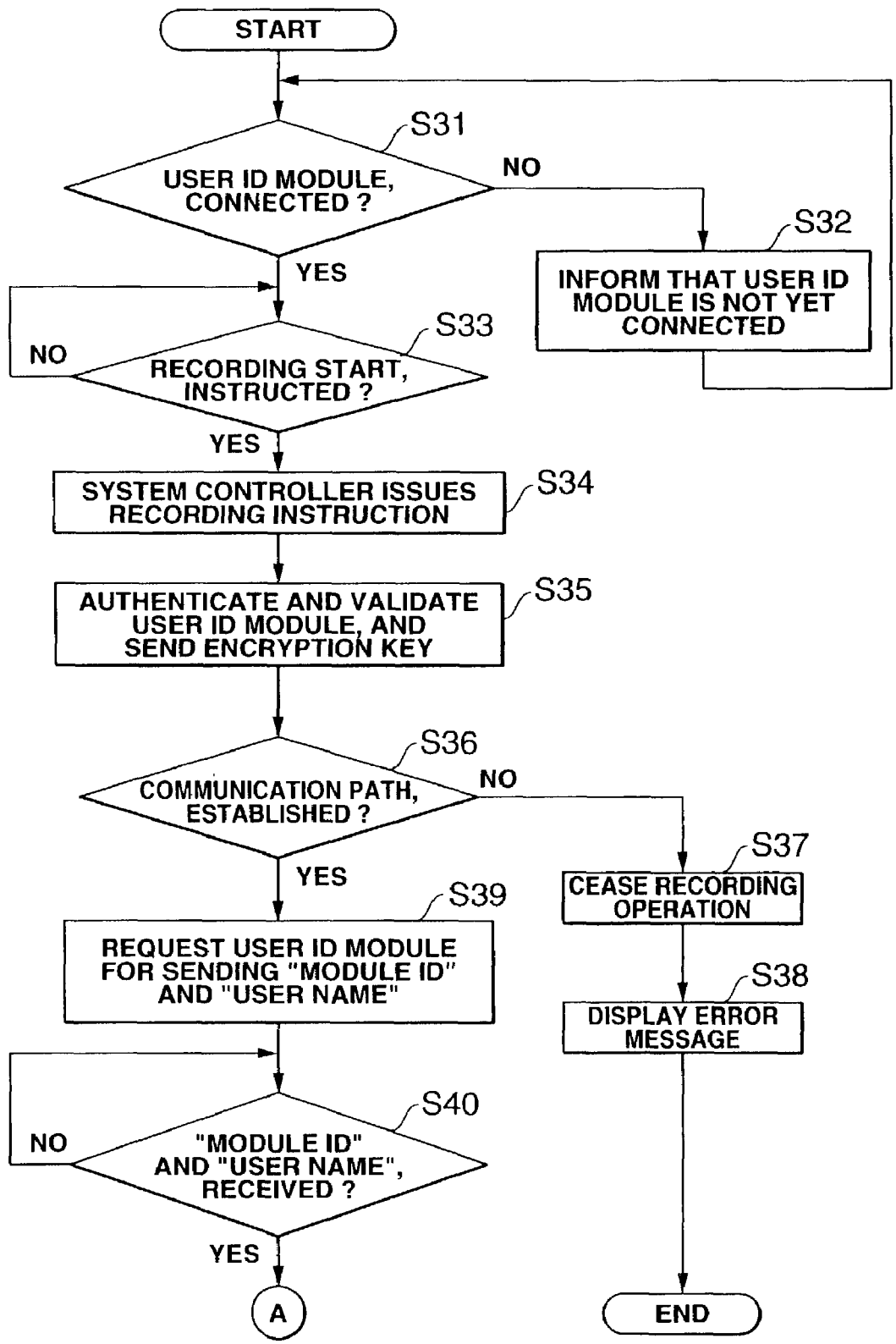
FIG. 6 is a flow chart for explanation of the recording operations made by the first embodiment of the present invention.
Figure 7:
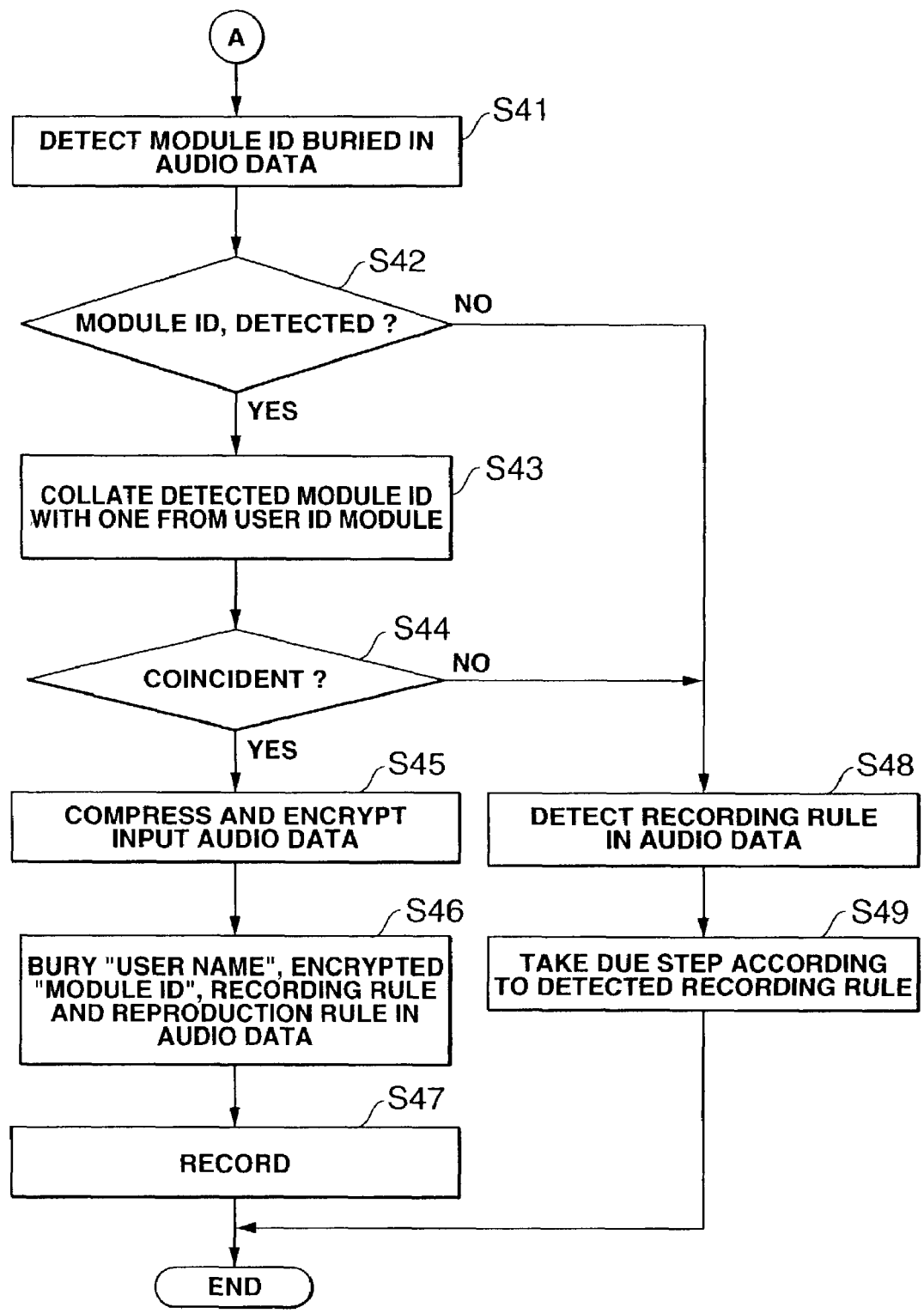
FIG. 7 is a flow chart for explanation of recording operations made by the first embodiment of the present invention.

Next, operations made at the data recorder/player 10 for recording data will be described with reference to the flow charts shown in FIGS. 6 and 7.

For data recording in this embodiment, the user ID module 20 has to be connected to the data recorder/player 10. That is, the data recorder/player 10 first judges whether the user ID module 20 is connected thereto (in step S31). If it judges in step S31 that the user ID module 20 is not yet connected thereto, it will inform the user, by displaying on the display unit 16, that the user ID module 20 is not connected, and prompt to connect the user ID module 20 to the data recorder/player 10 (in step S32). In this case, the prompt to the user may be a video message or voice message like "the user ID module is not yet connected. For recording, connect the user ID module". The video message is displayed on the display unit 16.

If the data recorder/player 10 detects in step S31 that the user ID module 20 is connected thereto, it will wait for an "instruction for recording" given by the user via the input controller 15 (in step S33). When it is detected in step S33 that a "recording instruction" is received, the system controller 13 of the data recorder/player 10 supplies a recording instruction to the recording/playback engine chip 11 and recording/playback unit 12 to make preparations for data recording (in step S34).

Next, the recording/playback engine chip 11 authenticates and validates the security chip 21 in the user ID module 20, and transmits an encryption key (in step S35). The recording/playback engine chip 11 judges whether it has successfully authenticated the security chip 21 and established a communication path (in step S36). If it judges in step S36 that it has failed in the authentication of the security chip 21 and thus in establishment of a communication path, the recording/playback engine chip 11 will cease the recording procedure (in step S37) and then exit this routine-of-operation with display of an error message on the display unit 24 (in step S38).

When the recording/playback engine chip 11 judges in step S36 that the communication path could be established, it will issue a request for sending a user ID, that is, a module ID and user name in this case, to the user ID module 20 (in step S39).

In response to the request for sending the user ID, the security chip 21 in the user ID module 20 reads the module ID and user ID from the nonvolatile memory 22, encrypts them and sends them to the data recorder/player 10. The recording/playback engine chip 11 in the data recorder/player 10 will check if the module ID and user ID have been received by the data recorder/player 10 (in step S40).

After making sure the reception of the module ID and user ID in step S40, the recording/playback engine chip 11 tries to detect the module ID buried in audio data (in step S41), and judges whether the module ID could be detected (in step S42). If the module ID could be detected in step S42, the recording/playback engine chip 11 collates, by comparison, the detected module ID with a one available from the user ID module 20 (in step S43).

The recording/playback engine chip 11 judges whether the collation made in step S43 shows that both the module IDs is coincident with each other (in step S44). When both the module IDs are found to be is coincident with each other, the recording/playback engine chip 11 enables the recording, compresses the input audio data and encrypts them with the received user ID being taken as an encryption key (in step S45).

In this case, however, only the user name, only the module ID or both may be used as the encryption key.

There will be buried in the audio data compressed and encrypted in step S45 "user name" and "module ID" available from the user ID module 20 (in step S46). In this case, the module ID is encrypted before being buried to improve the concealment of the user ID. Further in step S46, a recording rule and reproduction rule are buried in the audio data to be recorded.

As above, the audio data in which the encrypted user ID etc. are buried are recorded to the disc 30 as a recording medium (in step S47).

On the other hand, if the module ID could not be detected in step S42 and when there is found in step S44 no coincidence between the module ID detected from the audio data and module ID available from the user ID module 20, the recording rule buried in the audio data is detected (in step S48) and operations conforming to the detected recording rule are effected (in step S49).

For burying information such as the recording rule, a technique called "digital watermarking" or any other well-known burying technique may be used. Also, such information may be buried not in audio data but in a recording area other than a recording area in which audio data are recorded such as an area where TOC (table of contents) data is recorded or in a sub code area.

The above-mentioned recording rules to be buried include the following of which any one is selected from them for burying in audio data:

R1 Recording (copying) is allowed for free
R2 Recording (copying) is allowed at cost
R3 Free recording (copying)
R4 Recording (copying) is inhibited Contents of the recording rule themselves may be recorded as information about the recording rule or there may also be recorded information indicating which one of the above-mentioned rules R1 to R4 is to be buried.

The rule R1 "recording (copying) is allowed for free" permits to record audio data only with a user ID buried in audio data. In this embodiment, this rule is followed to record audio data to a recording medium, such as a read-only disc (will be referred to as "ROM type" disc hereunder) made by a recording company using an authoring apparatus, without any user ID being buried since the disc is not yet owned by anybody at this stage. So, this rule is applied when recording (copying) audio data from a ROM-type recording medium.

The above rule R2 "recording (copying) is allowed at cost" permits a recorder capable of billing to record audio data only when the billing has been made. Under this rule, a recorder not capable of the billing is inhibited from recording audio data. The billing will be described in detail later using an example.

The rule R3 "free recording (copying)" permits to record (copy) audio data with no user ID being buried in the audio data. Further, the rule R4 "recording (copying) is inhibited" permits no recording of any audio data.

As above, the recording rules are applied when there is no coincidence between user IDs as well as when no user ID can be detected from audio data to be recorded. However, one recording rule may be recorded for application when no coincidence is detected between the user IDs while another recording rule may be recorded for application when no valid user ID can be detected.

For reproducing audio data in this embodiment, a user ID buried in the audio data is collated with a one stored in the nonvolatile memory 14 as will be described in detail later. When both the IDs are found to be coincident with each other, the audio data can be reproduced. In this embodiment, when no user ID can be detected in the audio data to be reproduced or when the result of collation is that the user IDs show no coincidence between them, a reproduction rule (playback condition) specifying how the audio data are to be processed is buried in the audio data in step S46.

Information about the reproduction rule may be buried in audio data using the digital watermarking or any other well-known burying technique as in the case of the aforementioned recording rule. Also, such information may be buried not in audio data but in a recording area other than a recording area in which audio data are recorded such as an area where TOC (table of contents) data is recorded or in a sub code area.

When there is no coincidence between user IDs, any one is selected from the following for burying in the audio data:
PB1 Reproduction is allowed for free
PB2 Reproduction is inhibited (reproduction is disabled)
PB3 Reproduction is allowed at cost
PB4 Reproduction is limitatively allowed Contents of the reproduction rule themselves may be recorded as information about the reproduction rule or there may also be recorded information indicating which one of the above-mentioned rules PB1 to PB4 is to be buried.

The rule PB1 "reproduction is allowed for free" permits to always reproduce audio data independently of any user ID registered in the player. The rule PB2 "reproduction is inhibited (reproduction is disabled)" inhibits audio data from being reproduced when there is no coincidence between the user ID buried in the audio data and the user ID registered in the player. In this embodiment, since audio data are recorded, with no user ID buried therein, to a recording medium such as a ROM-type disc made by a recording company by the authoring apparatus as above, the rule PB1 is recorded in the audio data for application when no valid user ID can be available from the reproduced audio data.

Also, the rule PB3 "reproduction is allowed at cost" permits a player capable of billing to reproduce audio data when the billing is possible. If the player is not capable of such billing, audio data cannot be reproduced. Note that the billing will be described in detail later taking an example.

The rule PB4 "reproduction is limitatively allowed" permits to reproduce audio data for test-listening to all or a part of the audio data. After completion of the test-listening mode, the rule PB2 or PB3 is applied to the reproduction of audio data. For the test-listening, any of the following is allowed:
(a) Free reproduction by n times, for example, once
(b) Free reproduction for m seconds
(c) Free reproduction of most affecting passage or climax part When the test-listening mode (a) or (b) is applied for the reproduction rule PB4 "reproduction is limitatively allowed", information about the test-listening history of audio data identified with an ID content (identification code) such as ISRC (International Standard Recording Code), for example, number of times of test-listening, seconds for which the test-listening has been made, etc., is registered in the player correspondingly to the ID content.

In this embodiment, the reproduction rule is applied in common when no coincidence is found between the user IDs for data reproduction as well as when no valid user ID is available from reproduced audio data. However, one reproduction rule may be recorded for application when no coincidence is found between user IDs while another reproduction rule may be recorded for application when no valid user ID is available from audio data.

For example, in case a recording medium such as a ROM-type disc or the like made by a recording company using an authoring apparatus has recorded therein a specific ID like "ORIGINAL" indicating that the recording medium is an original, the player, having detected the specific ID, should be allowed to reproduce audio data from the recording medium even if the specific ID is not coincident with the user ID of the player itself. Therefore, in case a reproduction rule is to be buried in audio data, it should be "reproduction is allowed".

On the other hand, in case it is prescribed that such a specific ID should be recorded, by burying or otherwise, in audio data recorded in a recording medium such as a ROM-type disc or the like, the audio data may be taken as illicitly recorded data if no valid user ID is available in the player. Therefore, the reproduction rule should be "reproduction is inhibited" in this case.

One of the above reproduction rules can be used in common in recording media such as ROM-type discs made by recording companies using an authoring apparatus in case it is prescribed that no user data should be recorded in the recording media.

[Reproducing Operations Made at the Data Recorder/Player 10]

Figure 8:
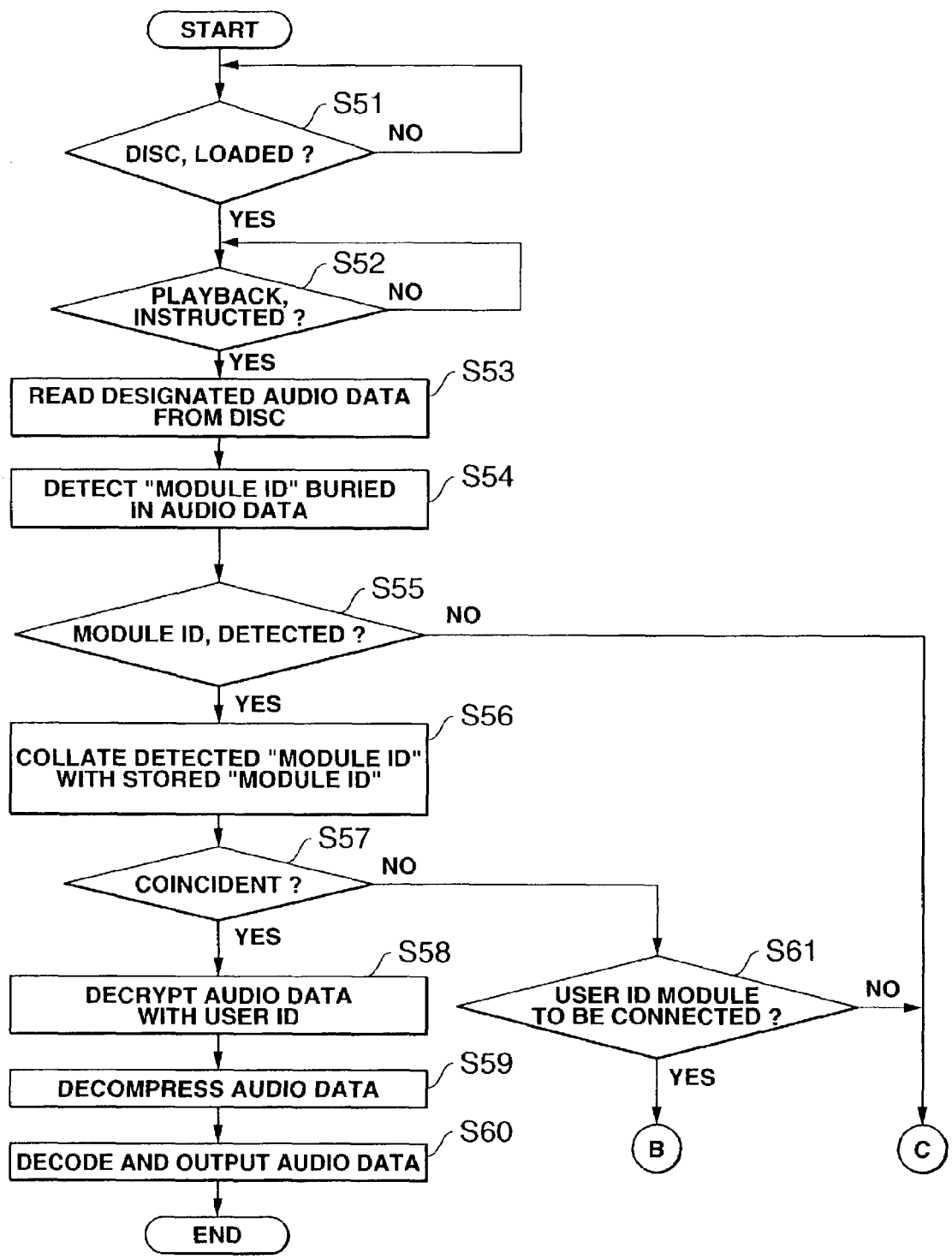
FIG. 8 is a flow chart for explanation of playback operations made by the first embodiment of the present invention.
Figure 9:
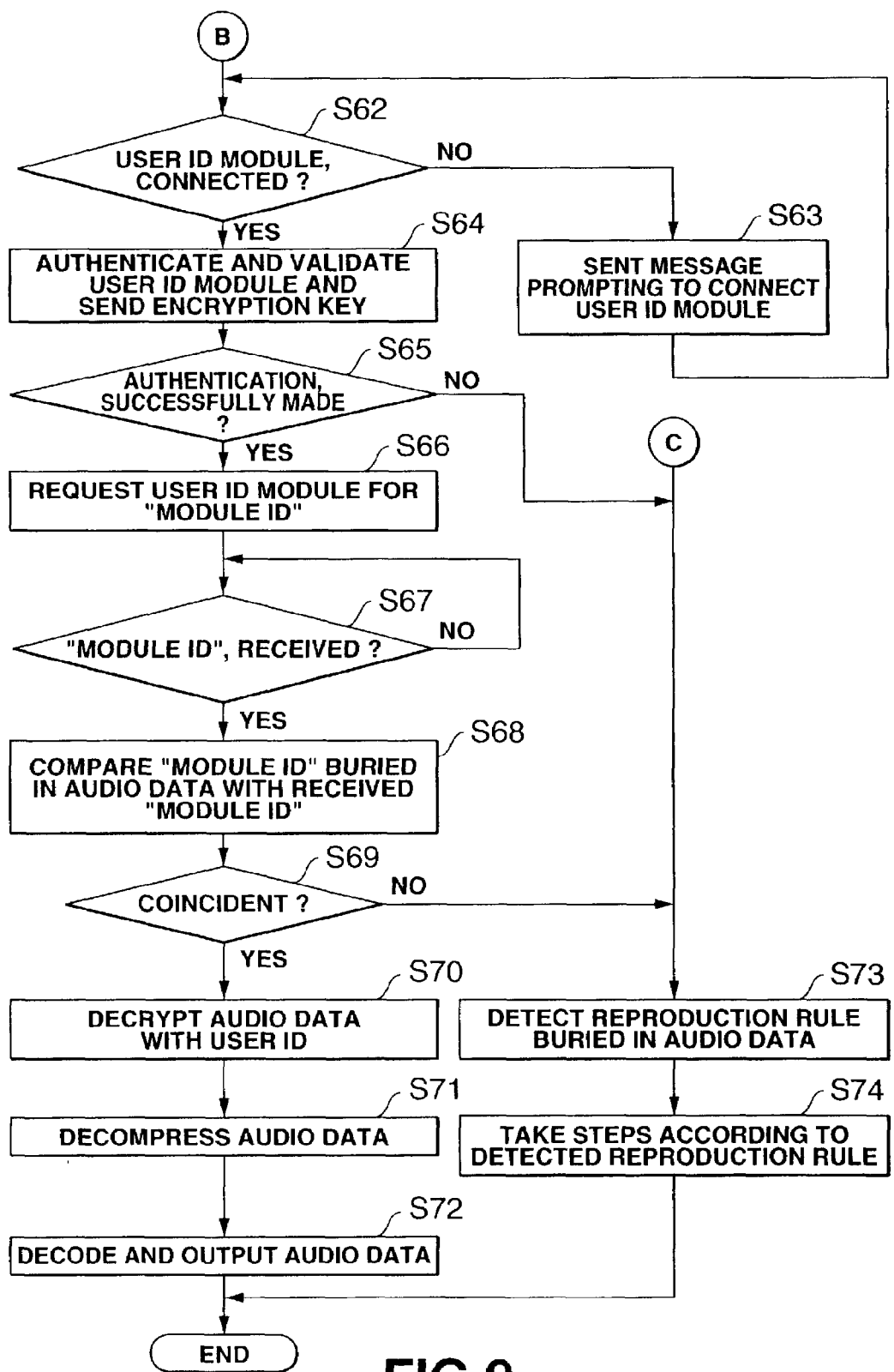
FIG. 9 is a flow chart for explanation of playback operations made by the first embodiment of the present invention.

Next, operations made at the data recorder/player 10 for reproducing audio data having been recorded as above will be described with reference to FIGS. 8 and 9.

First, a recorded disc is loaded into the data recorder/player 10. Recognizing when the recorded disc is set in the data recorder/player 10 (in step S51), the recording/playback engine chip 11 will wait for a playback instruction from the user. When the recording/playback engine chip 11 has recognized the playback instruction given by the user via the input controller 15 (in step S52), it reads audio data which it has thus been instructed to reproduce from the disc (in step S53).

A user ID buried in the thus read audio data is detected. In this embodiment, an encrypted module ID of the user ID is decrypted to detect the user ID (in step S54). It is judged whether the module ID could be detected (in step S55). If the module ID could not be detected, a reproduction rule buried in the audio data to be reproduced is detected (in step S73) and a due step is taken according to the detected reproduction rule (in step S74).

When it is judged in step S55 that the module ID could be detected, the detected module ID is collated, by comparison, with a one stored in the nonvolatile memory 14 (in step S56).

It is judged whether the module IDs are coincident with each other (in step S57). If it is judged in step S57 that the module IDs are coincident with each other, the encrypted audio data for which the user ID is used are decrypted (in step S58), and decompressed, that is, expanded (in step S59). The expanded or decompressed audio data are decoded before being outputted (in step S60).

On the other hand, if it is judged in step S57 that there is no coincidence between the module ID detected from the audio data read from the disc 30 and that read from the nonvolatile memory 14, it is judged whether the data recorder/player 10 has been set to have the user connect the user ID module 20. If the result of judgment is that no such setting has been made, the reproduction rule buried in the audio data to be reproduced is detected (in step S73) and a due step is taken according to the detected reproduction rule (in step S74). In this embodiment, playback of the disc 30 is inhibited, for example.

The above playback inhibition includes also blocking of the data recorder/player 10 from providing normal output of reproduced audio data. Namely, the data recorder/player 10 outputs a noise as the playback output. Alternately, the data recorder/player 10 may be adapted to provide a message like "this is a playback of an illicitly copied recording medium" instead of the playback output.

If it is judged in step S61 that the data recorder/player 10 has been set to have the user connect the user ID module 20, the data recorder/player 10 will judge whether the user ID module 20 is connected (in step S62). If it is judged in step S62 that the user ID module 20 is not connected, the data recorder/player 10 will inform the user of the fact and prompt the user to connect the user ID module 20 (in step S63).

When it is detected that the user ID module 20 is connected to the data recorder/player 10, the recording/playback engine chip 11 makes mutual authentication and validation with the user ID module 20 and transmits an encryption key (in step S64). Further the recording/playback engine chip 11 judges whether the mutual authentication and communication path establishment have successfully been made between the recording/playback engine chip 11 and user ID module 20 (in step S65). If the mutual authentication could not be made and the communication path could not be established between the recording/playback engine chip 11 and user ID module 20, the recording/playback engine chip 11 takes a due step according to the reproduction rule buried in the audio data (in steps S73 and S74). In this embodiment, playback of the disc 30 is inhibited as above.

When it is judged in step S65 that the communication path could be established between the recording/playback engine chip 11 and user ID module 20, the recording/playback engine chip 11 will send, to the user ID module 20, a request for sending a module ID in the user ID, in this embodiment (in step S66).

In response to the sending request from the recorder/playback engine chip 11, the security chip 21 in the user ID module 20 reads a module ID from the nonvolatile memory 22, encrypts it and sends the encrypted module ID to the data recorder/player 10. When the recording/playback engine chip 11 in the data recorder/player 10 validates the module ID sent from the user ID module 20 (in step S67), it will collate, by comparison, the module ID detected from the data read from the disc 30, with that received and decrypted or decoded (in step S68).

The recording/playback engine chip 11 judges whether the module IDs are coincident with each other (in step S69). When there is no coincidence between the module IDs, the recording/playback engine chip 11 will take a due step according to the reproduction rule buried in the audio data (in steps S73 and S74). As above, playback of the disc 30 is inhibited in this embodiment.

When the module IDs are coincident with each other, the encrypted audio data are decrypted or decoded with the user ID (in step S70), decompressed or expanded (in step S71). The decompressed or expanded audio data are decoded and outputted (in step S72).

In this embodiment, data are recorded to a disc 30 with a registered user ID buried in the data, and a user ID registered in the nonvolatile memory 14 and a user ID detected from the data read from the disc 30 are compared with each other, as having been described above. When the result of comparison shows that the user IDs are coincident with each other, the data read from the disc 30 are normally reproduced and outputted. Thus, audio data can only be copied for private use.

Also in this embodiment, since the user ID module 20 is adapted to record data only when it is connected to the data recorder/player 10, audio data can only be copied for private use.

In this embodiment, the recording side is limited as above while at the playback side, a user ID registered in the nonvolatile memory 14 is compared with a user ID detected in the data read from the disc 30 to judge whether the user IDs are coincident with each other, and so for data recording, the user ID module 20 may not be connected to the data recorder/player 10. Namely, the user can reproduce the data with a greater convenience.

For "free copying only for private use", information about a personally acquired right of listening (information about all contents which it has been authorized to reproduce for private listening) may be recorded to a personal IC card which has to be inserted into the player, for reproducing the contents. This is just an example. In this case, to prevent the IC card from being used by any other user, the users are managed for each to have an exclusive IC card.

Since the IC card has recorded therein each user's right of listening for all the contents, the user can freely copy the contents. In this case, however, the user has to carry on the IC card which is to be inserted into the player each time he is going to copy the contents for listening, which will be a great inconvenience.

That is, the above embodiment is very convenient since it eliminates the above inconvenience since it requires such an IC card.

In this embodiment, since data are encrypted, for recording, with a user ID buried as an encryption key in the data, the recorded data can only be decrypted and decoded for reproduction when the user IDs are coincident with each other, which surely allows the data to be reproduced solely within a range of private use.

Note that use of a user ID not as an encryption key but as information about encryption such as information intended for acquisition of a key for encryption of data to be recorded is expectable to provide a similar effect. However, in case the recording or reproduction rule allows data recording or reproduction even when there is no coincidence between user IDs, the user ID may not always be used as the encryption key.

In the above embodiment, information about a user ID from the user ID module 20 is encrypted and sent to the data recorder/player 10, so that the user ID can effectively be concealed.

In this embodiment, since recording and reproduction rules are buried in audio data, information about these rules is detected from the audio data. In case information about recording and reproduction rules is recorded in TOC data or TOC area, however, the information should be acquired before recording or reproducing audio data.

In case audio data have been compressed and blocked, recording and reproduction rules may be buried in a space between blocks. In this case, information about the recording and reproduction rules can be extracted for decompression and decoding of the audio data.

In case the data recorder/player 10 is designed to accommodate a plurality of recording media together for simultaneous reproduction and recording and also for data recording (copying), information about recording and reproduction rules may be acquired from TOC data or reproduced data in a disc at the reproducing side in advance.

In the aforementioned embodiment of the present invention, recording and reproduction rules have to be recorded in audio data. Note however that by designing the system so that one of the above recording and reproduction rules is always applied when no user ID is available or when there is no coincidence between user IDs, it becomes unnecessary to record the recording and reproduction rules in the audio data.

SECOND EMBODIMENT

Figure 10:
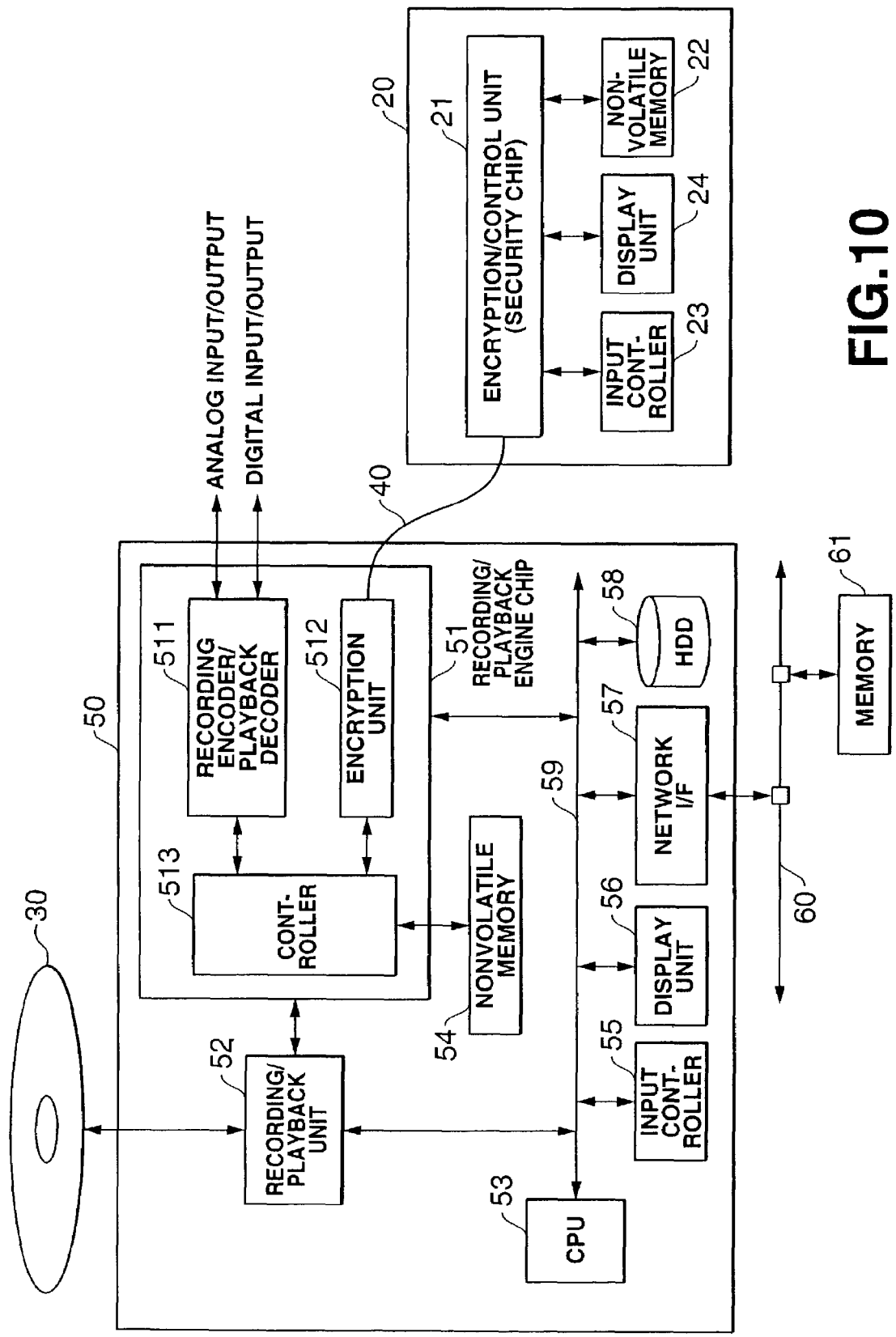
FIG. 10 is a block diagram of a second embodiment of the present invention.

In the second embodiment of the present invention, the data recorder/player is installed in a personal computer. FIG. 10 is a block diagram of a system to which the second embodiment is applied.

As shown, the system according to the second embodiment includes a personal computer 50 and the user ID module 20 used in the aforementioned first embodiment.

The personal computer 50 has terminals for connection of the user ID module 20. Information transferred between the personal computer 50 and user ID module 20 via the terminals for connection of the user ID module 20 is all encrypted.

Similarly to the data recorder/player 10 according to the first embodiment, the personal computer 50 includes a recording/playback engine chip 51, recording/playback unit 52 and a nonvolatile memory 54, and has connected thereto a CPU 53, input controller 55, display unit 56, network interface 57 and a hard disc drive 58 via a system bus 59. The system bus 59 has also connected thereto the recording/playback engine chip 51 and recording/playback unit 52.

The network interface 57 is connected to a memory 61 connected to a network 60. The network 60 may be a local area network (LAN) or Internet. In case the network 60 is the Internet, the memory 61 will be a recorder provided in a predetermined server or the like.

In this second embodiment, a user name is supplied for registration to the user ID module 20 as in the aforementioned first embodiment, and further the user ID is registered from the user ID module 20 into the personal computer 50. Thus, the user ID is registered into the nonvolatile memory 54.

The second embodiment uses, as the recording medium, not only the disc 30 as in the first embodiment but the memory 61 connected to the hard disc drive 58 and network 60.

In data recording in the second embodiment, the data will flow between an input source and recording medium in combination as follows:

(1) Analog or digital input to disc 30
(2) Analog or digital input to hard disc drive 58
(3) Analog or digital input to memory 61
(4) Disc 30 to hard disc drive 58
(5) Disc 30 to memory 61
(6) Hard disc drive 58 to disc 30
(7) Hard disc drive 58 to memory 61
(8) Memory 61 to disc 30
(9) Memory 61 to hard disc drive 58

In addition to the above nine combinations, data transfer from one memory to another in the network 60 may be considered as one of the recording operations. In each of the recording operations in the second embodiment, the user ID module 20 has to be connected to the personal computer 50 as in the first embodiment and a user name and module ID acquired from the user ID module 20 are buried in audio data. In this case, the module ID is to be encrypted as in the first embodiment.

For data recording to the hard disc drive 58 in this case, data encoded in the recording/playback engine chip 51 are sent to the hard disc drive 58 via the system bus 59, not via the recording/playback unit 52, and thus stored into the hard disc drive 58.

For data recording to the memory 61, data encoded in the recording/playback engine chip 51 are sent over the network 60 to the memory 61 via the system bus 59 and network interface 57, not via the recording/playback unit 52, and thus stored into the memory 61.

For reproduction of audio data from any of the disc 30, hard disc drive 58 and memory 62, a user ID detected in reproduced data is collated with a one stored in the nonvolatile memory 54 as in the aforementioned first embodiment. When they are coincident with each other, it is allowed to reproduce and output the audio data.

The second embodiment is as effective as the aforementioned first embodiment, and can allow a quick copying of audio data by the hard disc drive 58 solely for a private use by the user. The data transfer to the memory via the network can be considered as one manner of recording (copying) and is allowed only for the private use by the user.

EXAMPLE OF BILLING OPERATIONS

Figure 11:
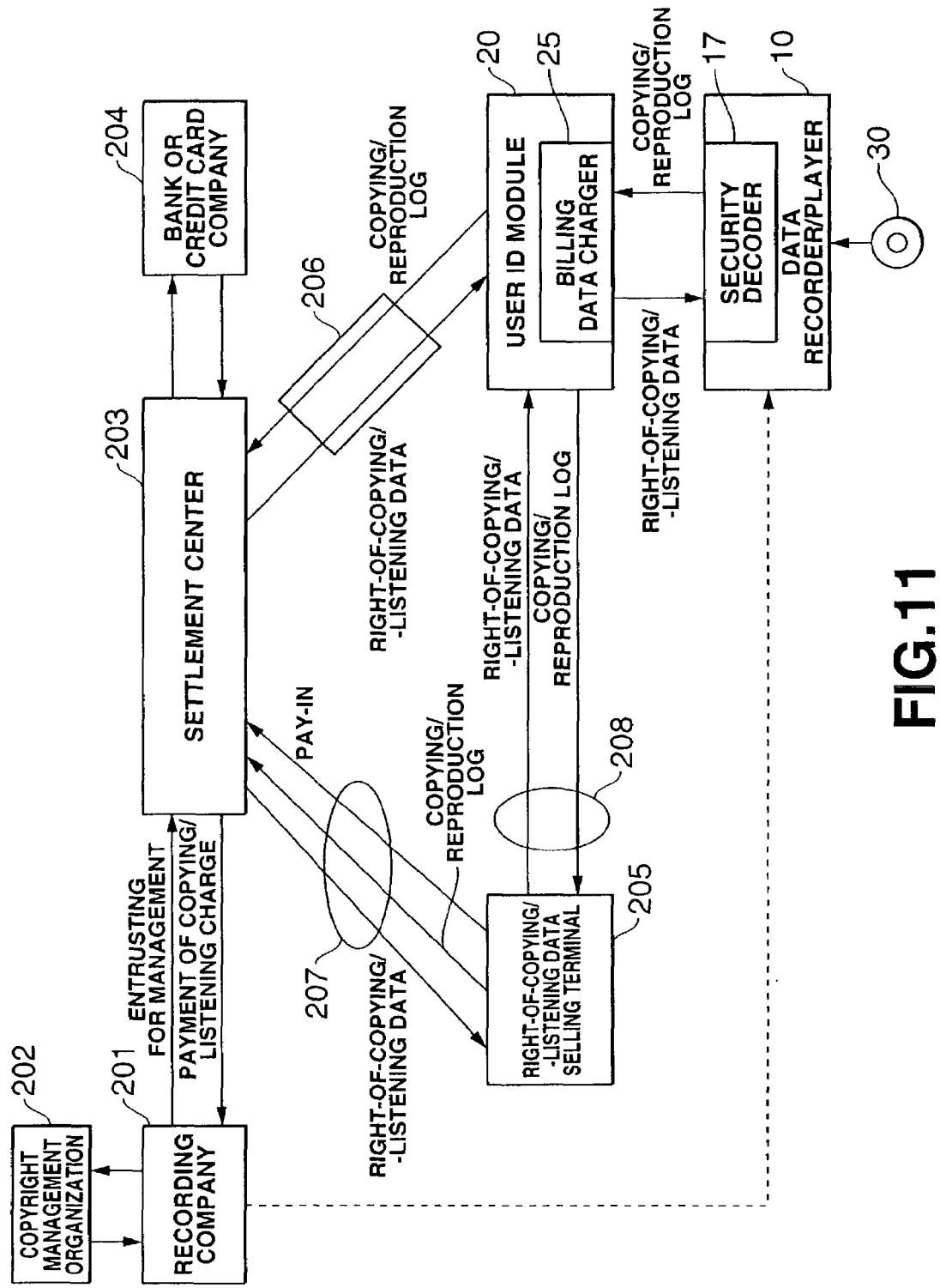
FIG. 11 is a flow chart for general description of the entire billing system in the embodiments of the present invention.

Next, an embodiment of the present invention in which billing-based recording and reproduction rules are applied will be described with reference to FIG. 11 showing an example of billing system in which distribution and transfer of musical contents are omitted. The data recorder/player 10 included in this embodiment is adapted to record data for copying. That is, with the data recorder/player 10, data from a disc can be recorded to another disc.

For billing in this embodiment, right-of-copying data is used for recording, while right-of-listening data is used for playback. These right-of-copying and right-of-listening data are stored in an IC card or in a security decoder 17 provided in the data recorder/player 10.

The right-of-copying data and right-of-listening data are a number of times data can be copied and a number of times data can be reproduced, respectively, for example. Each time the data recorder/player 10 records or reproduces data for which the user is billed, each of the numbers is decremented.

The right-of-copying and right-of-listening data can be rewritten by a user's own right-of-copying/-listening data charger or a right-of-copying/-listening data selling terminal 205 placed at a shop under the management by a right-of-copying/-listening data management company. In this embodiment, the right-of-copying/-listening data charger is provided as a billing data charger 25 in the user ID module 20.

Between the security decoder 17 of the data recorder/player 10 and the right-of-copying/-listening data selling terminal 205 placed in a settlement center 203, records shop, convenience store or the like, there is provided the billing data charger 25 which functions as a right-of-listening data relay.

The settlement center 203 is provided for settlement in relation with a recording company 201, copyright management organization 202 and data recorder/player 10 as a user device. The settlement center 203 includes an authentication/billing server, and makes a settlement in relation with a bank or credit card company 204.

In FIG. 11, a broken line indicates the distribution from the recording company 201 of a recording medium (optical disc, memory card or the like) having musical contents recorded therein and which is to be played in the data recorder/player 10. The distribution of musical contents may be done in any other different suitable manners. The data recorder/player 10 can record the musical contents to a recording medium (optical disc, memory card or the like) 30.

In this embodiment, the security decoder 17 in the data recorder/player 10 and billing data charger 25 in the user ID module 20 communicate with each other via a cable communication path to transfer right-of-copying/-listening data from the billing data charger 25 to a memory in the security decoder 17. The right-of-copying/-listening data corresponds to a permitted number of times of recording (copying) or a permitted time length of recording (copying)/permitted number of times of reproduction or to a permitted time length of reproduction in the data recorder/player 10.

The security decoder 17 of the data recorder/player 10 sends copying/reproduction log of the data recorder/player 10 to the billing data charger 25. The copying log includes identifiers for copied data and/or copying conditions. More particularly, it includes information such as identifiers for copied contents, types of the contents, number of times of copying, copying time, etc.

The reproduction log includes identifiers for decoded digital data and/or decoding conditions. More particularly, it includes information such as identifiers for musical contents to which the user has listened, types of the contents, number of times of reproduction, reproducing time, etc. In this embodiment, billing is made to decoding for data reproduction.

The copying/reproduction log also includes identifiers to identify a billing object such as owner of the user terminal, identifier for the data recorder/player 10 as a user device, etc. Between the security decoder 17 and billing data charger 25, there is made authentication by the encryption unit 112 and encryption/control unit 21 shown in FIG. 2 when necessary. When the authentication could be made between the encryption unit 112 and encryption/control unit 21, encrypted right-of-copying/-listening data and copying/reproduction log are transmitted.

The right-of-copying/-listening data are delivered from the settlement center 203 via a communication path 206, for example, a telephone line, to the billing data charger 25. Alternatively, right-of-copying/-listening data delivered from the settlement center 203 to the right-of-copying/-listening data selling terminal 205 via a communication path 207 are delivered to the billing data charger 25 via a communication path 208. Also in this case, authentication and encryption are effected between the settlement center 203 and billing data charger 25 for example to assure the security.

The copying/reproduction log sent to the billing data charger 25 is sent to the settlement center 203 via the communication path 206. Alternatively, the copying/reproduction log is delivered to the right-of-copying/-listening data selling terminal 205 via the communication path 208. The right-of-copying/-listening data 205 receives the right-of-listening data from the settlement center 203 via the communication path 207 while sending the reproduction log to the settlement center 203. Further, the right-of-copying/-listening data selling terminal 205 will pay the charge for the thus acquired right-of-listening data to the settlement center 203. The communication path 207 may be a telephone line, Internet or the like.

Between the settlement center 203 and billing data charger 25, there is transferred the right-of-copying/-listening data and copying/reproduction log via the communication path 206. Also in this case, authentication and encryption for data transfer are effected between the settlement center 203 and billing data charger 25 to assure the security. The bank and credit card company 204 are included in the system for the purpose of paying the charges for the right-of-listening data. The bank or credit card company 204 will debit a money equivalent to the right-of-copying/-listening data written to the billing data charger 25 against a pre-registered user's account upon request from the settlement center 203.

Further, the settlement center 203 is entrusted by the recording company 201 to manage the servicing of the right-of-copying/-listening data. The settlement center 203 provides right-of-copying/-listening data-related techniques to the recording company 201, and also pays for the listening to the musical data. The recording company 201 registers its copyrights in the copyright management organization 202 to request the latter for management of the copyrights and receive corresponding royalties from the copyright management organization 202.

Note that an IC card may be used instead of the communication path 208. More particularly, the billing data charger 25 and right-of-copying/-listening data selling terminal 205 are provided each with an IC card writer/reader. When the IC card is inserted into the billing data charger 25, the latter will acquire the right-of-copying/-listening data from the IC card and write the copying/reproduction log data to the IC card. When the right-of-copying/-listening data in the IC card is taken up by the billing data charger 25, it will be cleared to zero.

When a necessary number of times in the right-of-copying/-listening data is set by the user with the IC card being inserted in the right-of-copying/-listening data selling terminal 205, the set right-of-copying/-listening data will be written to the IC card. At the same time, the copying/reproduction log stored in the IC card are taken up by the right-of-copying/-listening data selling terminal 205 while the copying/reproduction log in the IC card is cleared.

In the above-mentioned embodiment of the billing system, in case an operation needing a billing is set as the recording or reproduction rule, the security decoder 17 in the data recorder/player 10 will make a billing for a data copying or reproduction.

Figure 12:
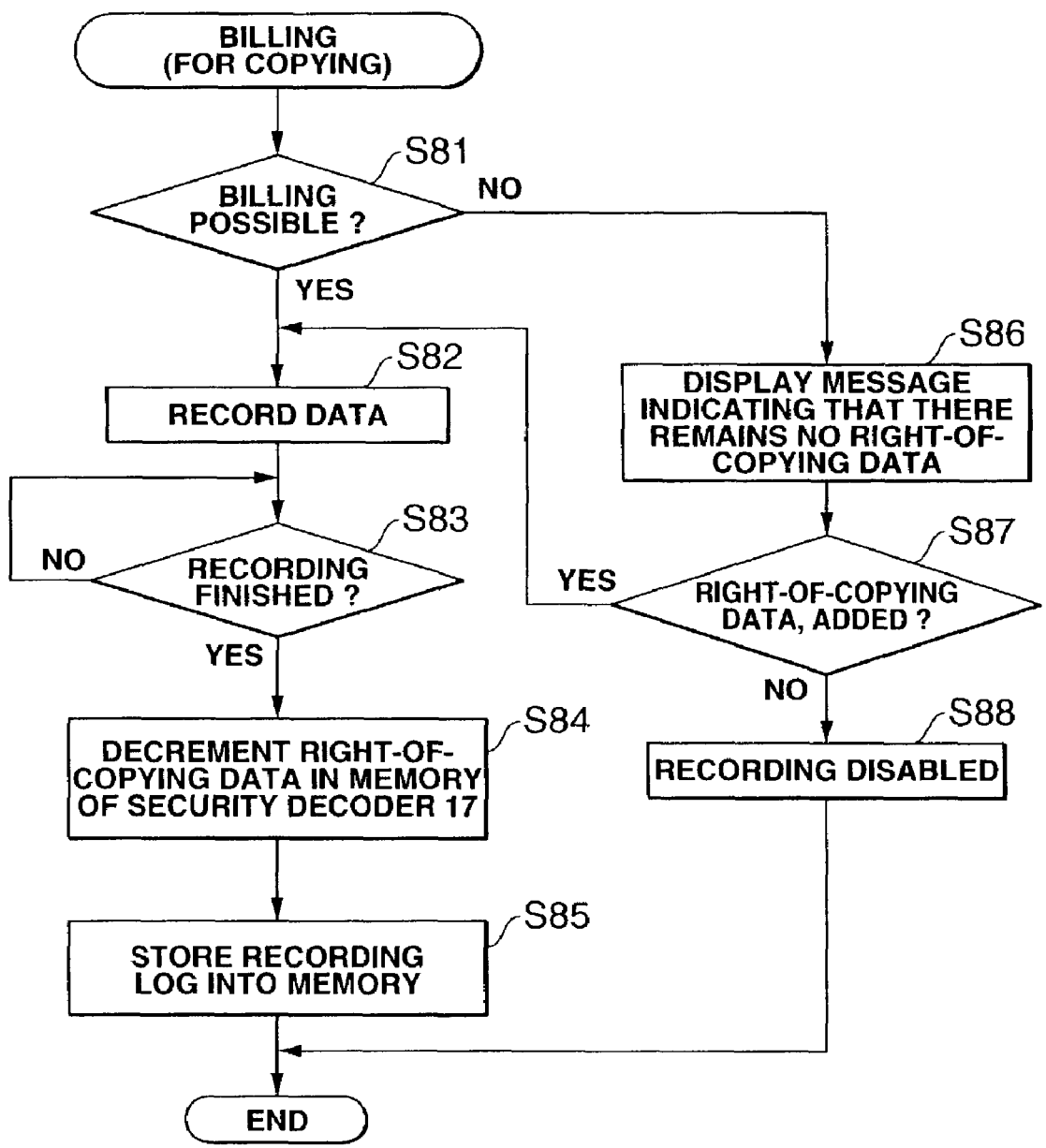
FIG. 12 is a flow chart for explanation of a billing made for recording (copying) in the embodiments of the present invention.

FIG. 12 shows a flow of operations made in step S49 when the recording rule is set in step S48 for application to a billing-based copying.

First, a remaining number of times copying can be done included in the right-of copying data in the memory in the security decoder 17 is checked to judge whether the billing operation is possible (in step S81). When it is judged in step S81 that the billing is possible, the recording (copying) is effected (in step S82). When it is made sure that the recording is complete (in step S83), the number of times copying can be done included in the right-of-copying data in the memory of the security decoder 17 is decremented (in step S84). As copying log, information such as identifier for a copied musical content, type of the content, number of times of copying, copying time, etc. is stored into the memory (in step S85) and the billing is ended.

On the other hand, if it is judged in step S81 that no billing is possible since there remains no number of times copying can be done included in the right-of copying data in the memory of the security decoder 17, the user is informed of the fact by displaying a message telling that there remains no number of times copying can be done in the right-of-copying data (in step S86). It is judged whether right-of-copying data has been added (in step S87). When the right-of-copying data has been added, the operation goes to step S82 where recording will be done and operations in step S83 and subsequent steps be effected. If it is judged in step S87 that there has not been added any right-of-copying data, it is judged that recording is impossible (in step S88), and the billing routine is ended.

Figure 13:
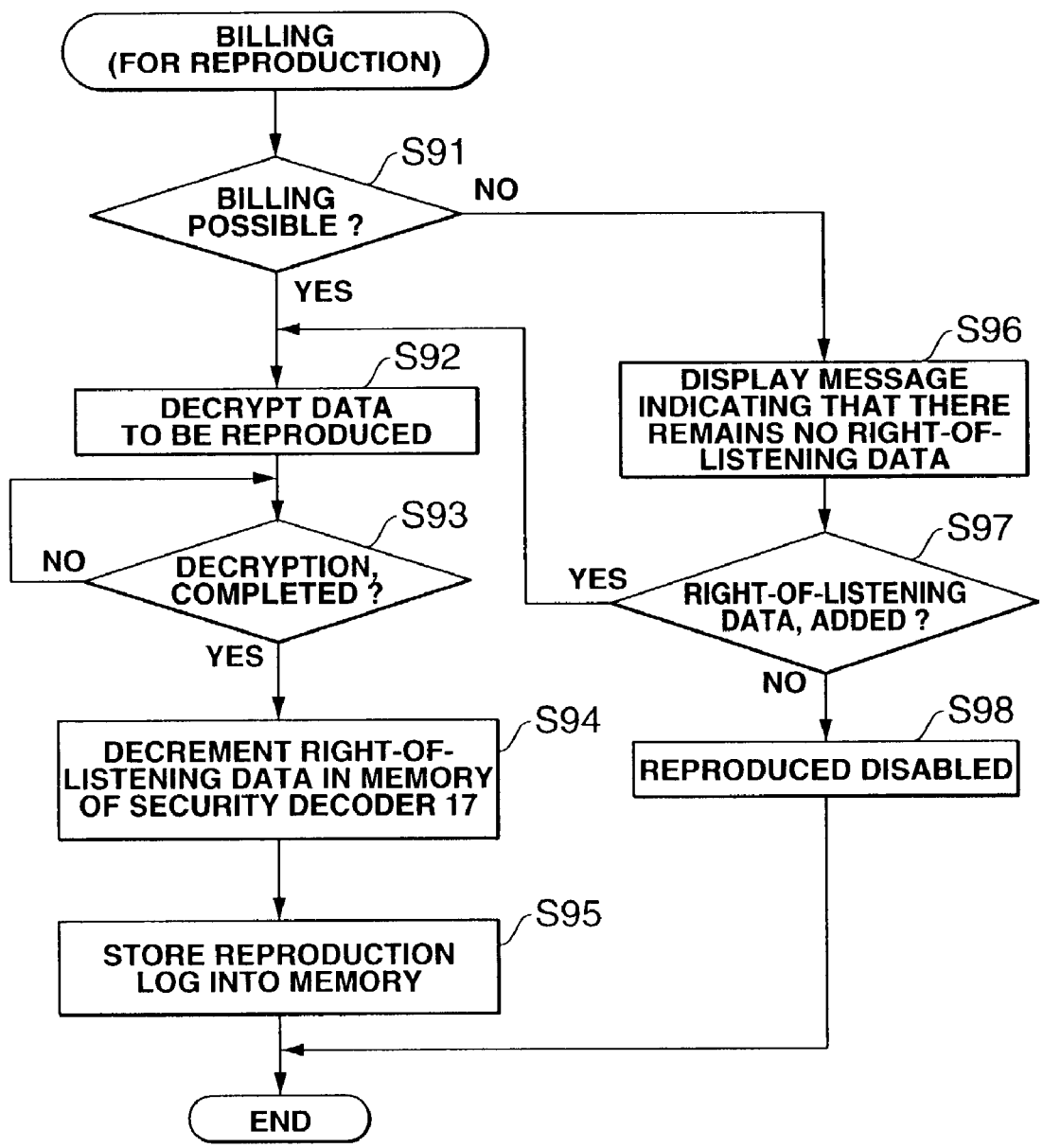
FIG. 13 is a flow chart for explanation of a billing made for playback in the embodiments of the present invention.

FIG. 13 a flow of operations made in step S74 when the reproduction rule is set in step S73 to be applied to a billing-based copying.

First, a permitted number of times listening can be done included in the right-oflistening data in the memory in the security decoder 17 is checked to judge whether the billing is possible (in step S91). When it is judged in step S91 that the billing can be done, data to be reproduced are decoded for decryption (in step S92). When it is made sure that the decoding is complete (in step S93), the number of times listening can be done included in the right-of-listening data in the memory of the security decoder 17 is decremented (in step S94). As reproduction log, information such as identifier for a reproduced musical content, type of the content, number of times of reproduction, reproducing time, etc. is stored into the memory (in step S95) and the billing is ended.

On the other hand, if it is judged in step S91 that no billing is possible since there remains no number of times listening can be done in the right-of-listening data in the memory of the security decoder 17, the user is informed of the fact by displaying a message telling that there remains no number of times listening can be done in the right-of-listening data (in step S96). It is judged whether right-of-listening data has been added (in step S97). When the right-of-listening data has been added, the operation goes to step S92 where decoding will be done and operations in step S93 and subsequent steps be effected. If it is judged in step S97 that there has not been added any right-of-listening data, it is judged that decoding is impossible (in step S98), and the billing routine is ended.

Note that the system may be adapted so that in step S98, the reproduction is not completely inhibited but reproduction of only the most affecting passage or climax part is allowed.

OTHER EMBODIMENTS OF THE PRESENT INVENTION

The aforementioned first and second embodiments of the present invention are adapted to reproduce data even with the user ID module not connected to the data recorder/player or personal computer. However, an embodiment other than the above may be designed to reproduce main data only when the user ID module is connected. That is, any other embodiment may be constructed with the nonvolatile memory 14 being omitted so that to collate a user ID from the user ID module with a one detected from main data to be reproduced, the user ID module has to be connected also for data reproduction.

Also, any other embodiment may be designed to operate similarly to the above first and second embodiments but only after confirming the use by making sure that the connection of the user ID module is connected to the data recorder/player and collating a user ID stored in the nonvolatile memory 14 with a one from the user ID module.

For data recording in the aforementioned first and second embodiments, the user ID module are authenticated and vadlidated but no validation using a user ID is effected. However, when the user ID module is connected to the data recorder/player for data recording, a user ID may be used for authentication and validation of the user ID module.

The first and second embodiments concern the data recorder/player, but the present invention is also applicable to a recording-only device and playback-only device. In this case, the user ID module should be accessory to the recording-only device in any embodiments like the first and second ones. In a playback-only device, it suffices to register a user ID once in the nonvolatile memory and the user ID module has not to be kept connected to the player for data reproduction.

Of course, the above other embodiments may be modified in various manners.

Note that the registration of a user ID in the first and second embodiments is to register a user ID in a playback unit included in the data recorder/player 10. Namely, in the first and second embodiments, the user ID module should be connected to the recorder without fail to record the user ID. Therefore, in case only the recording unit is taken in consideration, it is not necessary to register any user ID.

However, in case the recording-only device or the function of the recording unit of the data recorder/player is dedicated to a specific user, a user ID may be registered by the user ID module and stored in the nonvolatile memory to permit recording only when user IDs are coincident with each other.

The above embodiments use a user name or module ID as a use ID. In addition, they may be a fingerprint or voice print of the user or biometric information unique to each individual such as pulse as the user ID. In this case, a user ID such as biometric information stored in the nonvolatile memory and a one detected from data to be reproduced may be collate with each other in the player. Alternatively, no volatile memory nay be provided, and a user ID such as biometric information detected from main data to be reproduced and a one such as fingerprint, voice print or pulse, supplied from a biometric information input means may be collated with each other. In this case, the biometric information input means can use the user ID module.

Note that a commercially available recording medium such as a read-only type disc available from a recording company or the like should be handled as "ORIGINAL" and it is not owned by anyone as having previously been described. However, when data are copied from the "ORIGINAL" recording medium, a user ID will be buried in the copied data to identify the owner of the recording medium.

In the aforementioned embodiment, the user name is not specifically limited but it may be a personal name or a group name such as a family name. In short, a user name can be used in common within a range of "private use" prescribed in the Copyright Law.

By adapting a single recorder or player to register a plurality of user IDs therein, the single recorder or player can be used commonly by a plurality of users corresponding to the plurality of user IDs.

In the above embodiments, the user ID is buried in recorded. However, the user ID may of course be recorded in any area other than an area where the data are recorded. Also, when the recorded data are handled in units of file like computer data, The user ID can be added to the recorded data in units of a file.

In the above embodiments, when recording data, the user ID module 20 has to be connected to the data recorder/player 10. For data recording, however, a user ID (especially, a module ID) stored in the nonvolatile memory 14 of the data recorder/player 10 and a one carried by data to be recorded may be collated with each other by comparison without having to connect the user ID module 20 for data recording.

Also, the recording rule may be such that when the user ID stored in the nonvolatile memory 14 is coincident with a one carried by main data to be recorded, the user ID module 20 has not to be connected to the data recorder/player 10.

A user ID carried by the main data to be recorded does not only mean a one buried in the data to be recorded but also a one acquired from a TOC area of a recording medium or an area other than an area where the main data are to be recorded. Also, the user ID includes a one added at the top, middle or end of data downloaded from the Internet.

Of course, data to be recorded includes, not ones reproduced from a recording medium in the data recorder/player 10, ones supplied as analog or digital data. In this case, the input data may not be ones reproduced from a disc.

Note that in the above embodiments, the audio data have been taken as the example of a content to be recorded but they may be any contents whose copyrights have to be managed such as video data and programs, game programs and data, etc.

The recording medium is not limited to any disc but may be a card type memory, semiconductor memory, hard disc used in a hard disc drive, etc. Further, data to be recorded are not limited to ones reproduced from a recording medium as above, but may be ones sent via a cable telephone line, radio telephone line or Internet.

INDUSTRIAL APPLICABILITY

According to the present invention, for data recording, a registered user ID is recorded along with main data to be recorded while for data reproduction, a user ID available from the nonvolatile memory 14 is compared with a user ID detected from data read from a recording medium. When the user IDs are coincident with each other, the main data can be normally reproduced. Thus, it is permitted to copy the main data only for a private use.

The invention claimed is:

1. A method of reproducing audio data from a recording medium, comprising the steps of:

connecting a user identification module to a data player for reproducing the audio data from the recording medium;

mutually authenticating the user identification module and the data player;

reading the audio data from the recording medium using the data player;

comparing module identification data buried in the read audio data with module identification data in the user identification module;

if the compared module identification data is coincident, reproducing the audio data; and if the compared module identification data is not coincident, detecting a reproduction rule buried in the read audio data and reproducing the audio data in accordance with the reproduction rule;

wherein the audio data is reproduced when the compared module identification data is coincident by decrypting the audio data using user identification data from the user identification module, decompressing the decrypted audio data, and decoding the decompressed audio data.

2. A system for reproducing audio data, comprising:

a data player for reproducing the audio data from a recording medium;

a user identification module connected to the data player via a cable; wherein the user identification module contains module identification data uniquely identifying the user identification module and user identification data uniquely identifying a user;

the system mutually authenticates the data player and the user identification module;

the data player reads the audio data from the recording medium and compares module identification data buried in the read audio data with the module identification data in the user identification module;

wherein if the compared module identification data is coincident, the data player reproduces the audio data; and wherein if the compared module identification data is not coincident, the data player detects a reproduction rule buried in the read audio data and reproduces the audio data in accordance with the reproduction rule;

wherein the audio data is reproduced when the compared module identification data is coincident by decrypting the audio data using user identification data from the user identification module, decompressing the decrypted audio data, and decoding the decompressed audio data.

* * * * *

UNITED STATES PATENT AND TRADEMARK OFFICE
CERTIFICATE OF CORRECTION

PATENT NO. : 7,278,166 B2 Page 1 of 1
APPLICATION NO. : 10/088337
DATED : October 2, 2007
INVENTOR(S) : Tatsuya Inokuchi, Yoichiro Sako and Mitsuru Toriyama It is certified that error appears in the above-identified patent and that said Letters Patent is hereby corrected as shown below:

On the Title Page Item (54), the title should read --DATA RECORDING AND/OR REPRODUCING METHOD AND APPARATUS, AND RECORDING MEDIUM--;

In Column 1, lines 1-3, the title should read --DATA RECORDING AND/OR REPRODUCING METHOD AND APPARATUS, AND RECORDING MEDIUM--;

In Column 2, Line 51, "DISCLOUSURE" should read --DISCLOSURE--; and

In Column 19, Line 3, "The" should read --the--.

Signed and Sealed this

Twelfth Day of August, 2008

JON W. DUDAS
*Director of the United States Patent and Trademark Office*